Figure 1:
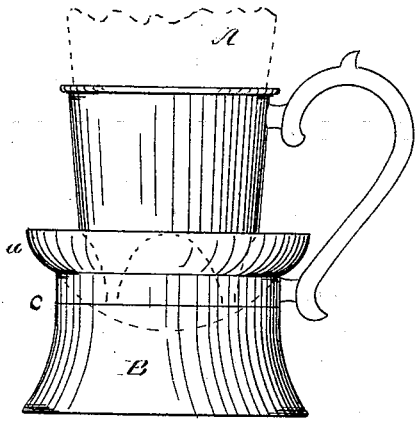

W. F. SHERMAN.
Vessels for Holding Liquids.

No. 196,487. Patented Oct. 23, 1877.

UNITED STATES PATENT OFFICE.

WILLIAM F. SHERMAN, OF LOWELL, MASSACHUSETTS.

IMPROVEMENT IN VESSELS FOR HOLDING LIQUIDS.

Specification forming part of Letters Patent No. 196,487, dated October 23, 1877; application filed August 17, 1877.

*To all whom it may concern:*

Be it known that I, WILLIAM F. SHERMAN, of Lowell, in the county of Middlesex and State of Massachusetts, have invented a certain new and useful Improvement in Vessels for Holding Liquids, which improvement is fully set forth in the following specification, reference being had to the accompanying drawings, making a part hereof.

My improvement consists in the combination, with an ordinary vessel, of a reservoir adapted to collect any overflow from the vessel and hold the liquid so collected.

In the drawings three forms of my invention are shown, in each of which A represents the vessel, and B the reservoir. The reservoir is covered by a wall, $a$, in which is a hole, $b$, through which the liquid flows into the reservoir. This wall is of such a shape that all the liquid which falls upon it will flow down through the hole into the reservoir, the hole being at the lowest part of the wall $a$.

Figure 3:
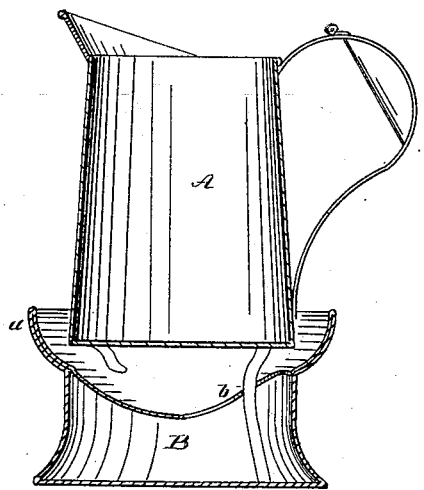
Figure 4:
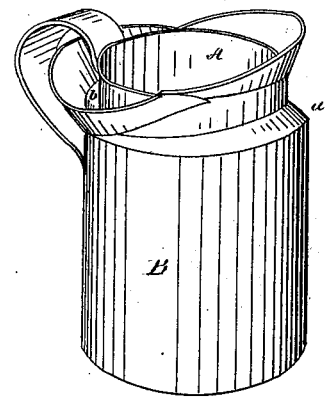

This reservoir may be near the bottom of the vessel, as shown in Fig. 3, or extend farther up, as shown in Fig. 4. In either case the hole $b$ is at the lowest point in the wall $a$, and so arranged that the contents of the vessel A can be poured out without spilling the contents of the reservoir.

When the reservoir is made as high as the vessel, the hole is usually placed, as shown in Fig. 4, in the side farthest from the lip, and having a lip or rim partly round it to collect the liquid better.

The reservoir may be placed underneath the vessel, in which case I prefer to fasten the vessel to it, as shown in Fig. 3, the wall $a$, in this case, projecting beyond the sides of the vessel, and the hole being in the lowest part of the wall $a$, and on the opposite side of the reservoir from the lip of the vessel, for the reason above stated.

Figure 2:
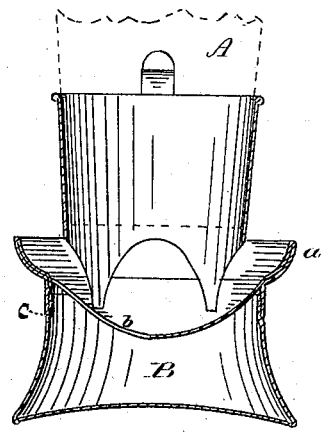

The vessel need not necessarily be attached to the reservoir. A holder may be fastened to the wall $a$, as shown in Figs. 1 and 2, and the vessel placed in the holder. This form of my invention is very well adapted for soda-water glasses and other similar uses, the vessel used being an ordinary tumbler, which sits in the holder, as is shown in Fig. 1.

I usually make the bottom of the reservoir so that it may be taken off and cleaned, the line where the top and bottom join being shown at $c$ in Figs. 1 and 2.

What I claim as my invention is—

The vessel A, in combination with the reservoir B and wall $a$, substantially as described.

WILLIAM F. SHERMAN.

Witnesses:
J. E. MAYNADIER,
GEORGE O. G. COAN.